(12) United States Patent
Jen et al.

(10) Patent No.: US 8,879,411 B2
(45) Date of Patent: Nov. 4, 2014

(54) METHOD OF HANDLING INTERFERENCE MITIGATION IN HETEROGENEOUS NETWORK BY CHANNEL MEASUREMENT AND RELATED COMMUNICATION DEVICE

(75) Inventors: Yu-Chih Jen, Taoyuan County (TW); Kwang-Cheng Chen, Taipei (TW); Shao-Yu Lien, Taipei (TW)

(73) Assignee: HTC Corporation, Taoyuan City, Taoyuan County (TW)

(*) Notice: Subject to any disclaimer, the term of this patent is extended or adjusted under 35 U.S.C. 154(b) by 56 days.

(21) Appl. No.: 13/326,346

(22) Filed: Dec. 15, 2011

(65) Prior Publication Data
US 2012/0320770 A1 Dec. 20, 2012

Related U.S. Application Data

(60) Provisional application No. 61/423,600, filed on Dec. 16, 2010.

(51) Int. Cl.
| | | |
|---|---|---|
| *H04L 1/00* | (2006.01) | |
| *H04J 1/16* | (2006.01) | |
| *H04J 3/14* | (2006.01) | |
| *H04W 72/08* | (2009.01) | |
| *H04W 24/10* | (2009.01) | |
| *H04W 84/04* | (2009.01) | |

(52) U.S. Cl.
CPC .......... *H04W 72/085* (2013.01); *H04W 24/10* (2013.01); *H04W 84/045* (2013.01)
USPC ......................................................... 370/252

(58) Field of Classification Search
CPC ................................................ H04W 72/085
USPC ........................................................ 370/252
See application file for complete search history.

(56) References Cited

U.S. PATENT DOCUMENTS

2007/0173276 A1* 7/2007 Love et al. .................... 455/522
2009/0047912 A1   2/2009 Lee (Continued)

FOREIGN PATENT DOCUMENTS

| CN | 1780457 A | 5/2006 |
|---|---|---|
| EP | 1940189 A2 * | 7/2008 |

(Continued)

OTHER PUBLICATIONS

ETSI TS 136 300 V9.1.0 (Oct. 2009), "LTE; Evolved Universal Terrestrial Radio Access (E-UTRA) and Evolved Universal Terrestrial Radio Access Network (E-UTRAN); Overall description; Stage 2(3GPP TS 36.300 version 9.1.0 Release 9)", Cover page+ p. 1-168.

(Continued)

*Primary Examiner* — Mark Rinehart
*Assistant Examiner* — Maharishi Khirodhar
(74) *Attorney, Agent, or Firm* — Winston Hsu; Scott Margo

(57) ABSTRACT

A method of handling resource arrangement for a first base station of a wireless communication system is disclosed. The method comprises obtaining channel information of a channel corresponding to a resource block from a measurement, a relay node of the wireless communication system or a second base station of the wireless communication system, wherein the resource block is identified by a time period and a frequency bandwidth; and arranging the resource block to a mobile device in the wireless communication system according to the channel information of the channel.

20 Claims, 3 Drawing Sheets

(56) References Cited

U.S. PATENT DOCUMENTS

| | | | |
|---|---|---|---|
| 2010/0041413 A1* | 2/2010 | Sumasu et al. | 455/452.2 |
| 2010/0267408 A1* | 10/2010 | Lee et al. | 455/509 |
| 2010/0323711 A1* | 12/2010 | Damnjanovic et al. | 455/450 |
| 2011/0138425 A1* | 6/2011 | Kim | 725/56 |
| 2011/0165871 A1* | 7/2011 | Juergen et al. | 455/424 |

FOREIGN PATENT DOCUMENTS

| | | | |
|---|---|---|---|
| WO | 2009103634 A1 | 8/2009 | |
| WO | 2010031436 A1 | 3/2010 | |

OTHER PUBLICATIONS

Office action mailed on Apr. 26, 2012 for the German application No. 10 2011 121 429.5, p. 1-12.

3GPP TR 36.814 V9.0.0 (Mar. 2010) Technical Report 3rd Generation Partnership Project; Technical Specification Group Radio Access Network; Evolved Universal Terrestrial Radio Access (E-UTRA); Further advancements for E-UTRA physical layer aspects (Release 9).

3GPP TS 36.420 V9.0.0 (Dec. 2009) Technical Specification 3rd Generation Partnership Project; Technical Specification Group Radio Access Network; Evolved Universal Terrestrial Radio Access Network (E-UTRAN); X2 general aspects and principles (Release 9).

3GPP TS 36.300 V10.1.0 (Sep. 2010) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

Office action mailed on Dec. 17, 2013 for the China application No. 201110425808.0, filing date Dec. 16, 2011.

* cited by examiner

METHOD OF HANDLING INTERFERENCE MITIGATION IN HETEROGENEOUS NETWORK BY CHANNEL MEASUREMENT AND RELATED COMMUNICATION DEVICE

CROSS REFERENCE TO RELATED APPLICATIONS

This application claims the benefit of U.S. Provisional Application No. 61/423,600, filed on Dec. 16, 2010 and entitled "Method and Apparatus for Autonomous Co-channel Interference Mitigations in Heterogeneous Networks by Channel Measurement", the contents of which are incorporated herein in their entirety.

BACKGROUND OF THE INVENTION

1. Field of the Invention

The present invention relates to a method used in a wireless communication system and related communication device, and more particularly, to a method of handling interference mitigation in a heterogeneous network by performing channel measurement and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicates with a core network including a mobility management entity (MME), a serving gateway, etc., for Non Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In addition to the advanced techniques mentioned above, the most effective way for improving quality of a received signal is to shorten a distance between a transmitter and a receiver in a wireless communication system. Thus, a heterogeneous network is proposed for introducing multiple layers of cells in the wireless communication system such that the distance between the transmitter and the receiver is shortened. For example, there are three types of cells and a relay node in the heterogeneous network. According to sizes of the cells, the cells are a macrocell, a picocell and a femtocell from the largest to the smallest. Besides, the macrocell, the picocell and the femtocell are managed by a macrocell base station (BS), a picocell BS and a femtocell BS, respectively. Different from a convention network including only macrocells, the heterogeneous network not only includes the macrocells, but each of the macrocells includes at least one picocell, at least one femtocell and at least one relay node for improving throughput of UEs in the heterogeneous network. In this situation, a UE in coverage of a macrocell may also be in coverage of a picocell or a femtocell in the macrocell. If the UE is near a picocell BS of the picocell or a femtocell BS of the femtocell and is far from a macrocell BS of the macrocell, the UE can communicate with the picocell BS or the femtocell BS with low transmission power to access services such as Internet, TV broadcasting, etc. Even if the UE is not in the coverage of the picocell and the femtocell, the UE may also communicate with the macrocell BS via a relay node which is near the UE. That is, the relay node serves as a bride between the UE and the macrocell BS, and forwards signals between the UE and the macrocell BS. In other words, the UE and the macrocell BS do not need to increase their transmission power greatly to communicate with each other. Therefore, power consumption of the UE and the macrocell BS can be reduced by using the picocell BS, the femtocell BS or the relay node. Furthermore, throughput of the UE is increased since quality of the signals transmitted and received by the UE is improved due to a short distance between the UE and the picocell BS, the femtocell BS or the relay node.

However, even though the power consumption of the UE and the macrocell BS is reduced, interference in the macrocell is increased since the picocell BS, the femtocell BS and the relay node may transmit and receive signals at the same time in an overlapped bandwidth and cause the interference to each other. Furthermore, since orthogonal frequency-division multiplexing (OFDM) and orthogonal frequency-division multiple access (OFDMA) adopted in the LTE system and the LTE-A system are wideband techniques, signals processed by the OFDM or the OFDMA are transmitted and received in any part of a bandwidth. That is, the picocell BS, the femtocell BS and the relay node may transmit and receive the signals in any part of the bandwidth at a given time. It is highly possible that the signals are transmitted and received in the same part of the bandwidth at the given time, i.e., the same resource block, and the signals interfere with each other. Thus, the interference in the macro cell becomes much severer in the LTE system and the LTE-A system. Benefit introduced by the heterogeneous network can not be realized efficiently. That is, an amount of the throughput of the UE that can be increased is limited due to the interference. Therefore, it is important to take the interference introduced by the heterogeneous network into consideration before arranging resource to the UE, to increase the throughput of the UE greatly.

SUMMARY OF THE INVENTION

The present invention therefore provides a method and related communication device for handling interference mitigation in a heterogeneous network by performing channel measurement to solve the abovementioned problems.

A method of handling resource arrangement for a first base station of a wireless communication system is disclosed. The method comprises obtaining channel information of a channel corresponding to a resource block from a measurement, a relay node of the wireless communication system or a second base station of the wireless communication system, wherein the resource block is identified by a time period and a frequency bandwidth; and arranging the resource block to a mobile device in the wireless communication system according to the channel information of the channel.

A method of handling channel measurement for a relay node of a wireless communication system is disclosed. The method comprises receiving a measurement request transmitted by a base station of the wireless communication system, and the measurement request indicating a channel and feedback resource; measuring the channel to obtain channel information of the channel or using the channel information stored in the relay node; and transmitting the channel information to the base station via the feedback resource.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
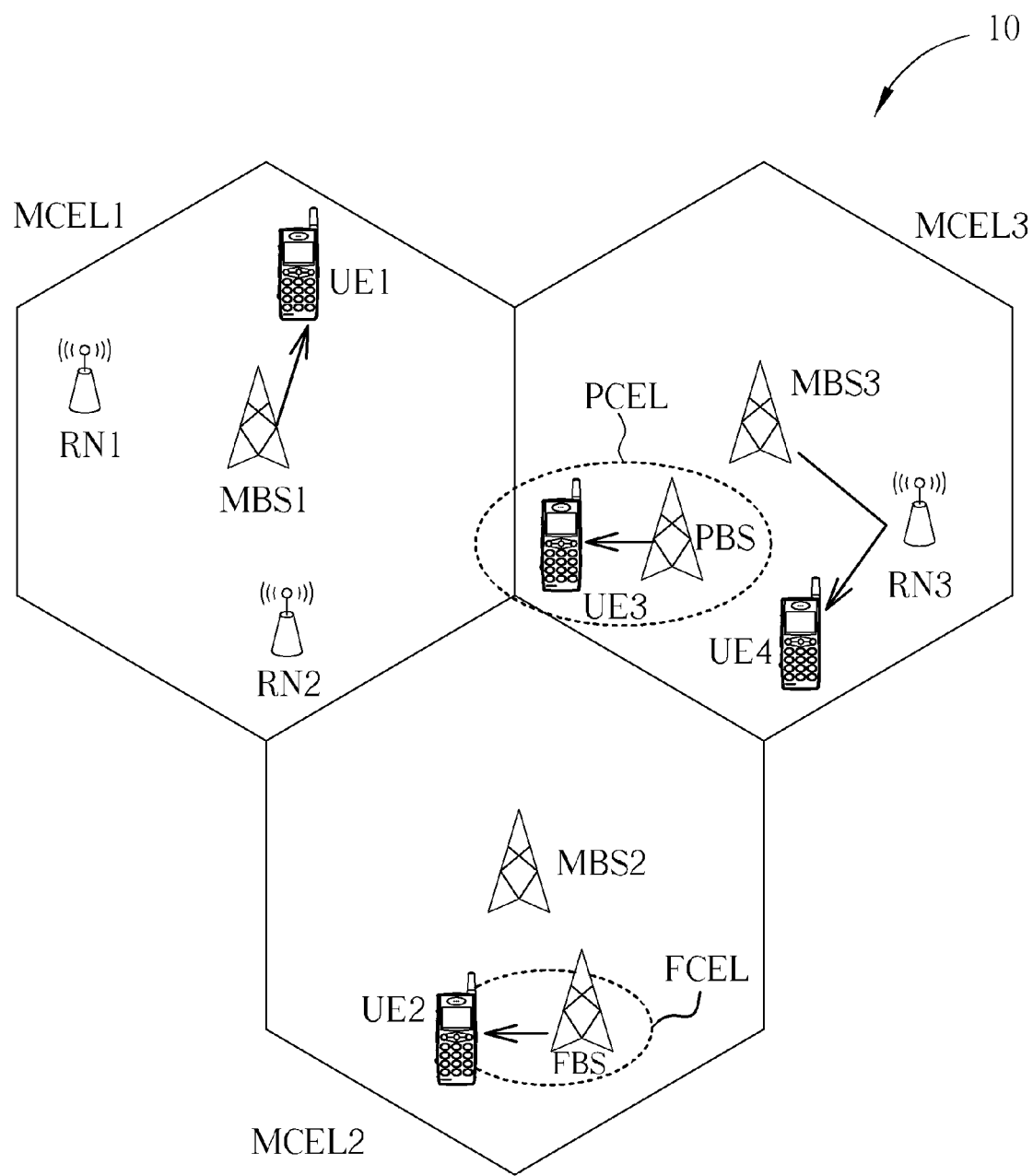
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of three macrocells MCEL1-MCEL3. The wireless communication system 10 may be a wideband code division multiple access (WCDMA) system such as a universal mobile telecommunications system (UMTS). Alternatively, the wireless communication system 10 may be an orthogonal frequency-division multiplexing (OFDM) system and/or an orthogonal frequency-division multiple access (OFDMA) system, such as a long term evolution (LTE) system or a LTE-Advanced (LTE-A) system. The macrocells MCEL1-MCEL3 are managed by macrocell base stations (BSs) MBS1-MBS3, respectively. Further, a user equipment (UE) UE1 and relay nodes (RNs) RN1-RN2 are in the macrocell MCEL1, a UE UE2 and a femtocell BS FBS of a femtocell FCEL are in the macrocell MCEL2, and UEs UE3-UE4, a picocell BS PBS of a picocell PCEL and a relay node RN3 are in the macrocell MCEL3. Therefore, the wireless communication system 10 can be seen as a heterogeneous network comprised of multiple layers of cells.

In general, a picocell, a femtocell and a relay node are deployed at a hot spot, an office, a community, etc. within a macrocell, for enhancing coverage of the macrocell, to provide services with better quality to a UE and to reduce power consumption of the UE and the macrocell BSs. When the UE is in coverage of the picocell, the femtocell or the relay node within the macrocell, the UE can communicate with a picocell BS of the picocell, a femtocell BS of the femtocell or the relay node which is near the UE, for accessing the services without communicating to a macrocell BS of the macrocell far from the UE.

For example, the macrocell BS MBS1 communicates with the UE UE1 directly for providing services to the UE as shown in FIG. 1, since the UE is not near a relay node or in coverage of a femtocell or a picocell. The macrocell BS MBS3 communicates with the UE UE4 via the relay node RN3, since the UE UE4 is near the relay node RN3 and is far from the macrocell BS MBS3. On the other hand, since the UE UE2 is in coverage of the femtocell FCEL, the UE UE2 communicates with the femtocell BS FBS for accessing the services without communicating with the macrocell BS MBS2. Similarly, the UE UE3 communicates with the picocell BS FBS for accessing the services without communicating with the macrocell BS MBS3. Therefore, the UEs and the macrocell BSs do not need to increase their transmission power to communicate with each other, but can communicate with each other with low transmission power as long as the UEs are near a relay node or in coverage of the femtocell FCEL or the picocell PCEL.

Please note that, the cells, the BSs and the UEs are simply utilized for illustrating the structure of the wireless communication system 10. Practically, the macrocell BSs MBS1-MBS3 can be referred as Node-Bs (NBs) in a universal terrestrial radio access network (UTRAN) of the UMTS or evolved NBs (eNBs) in an evolved UTRAN (E-UTRAN) of the LTE system or the LTE-A system, and are not limited herein. The picocell BS PCEL and the femtocell BS FCEL can be the NBs or the eNBs with small coverage or newly developed BSs with all or part of functions of the NBs or the eNBs. The UEs can be mobile devices such as mobile phones, laptops, tablet computers, electronic books, and portable computer systems. Besides, a station (e.g. a macrocell BS, a picocell BS, a femtocell BS or a relay node) and a UE can be seen as a transmitter or a receiver according to transmission direction, e.g., for an uplink (UL), the UE is the transmitter and the station is the receiver, and for a downlink (DL), the station is the transmitter and the UE is the receiver.

Figure 2:
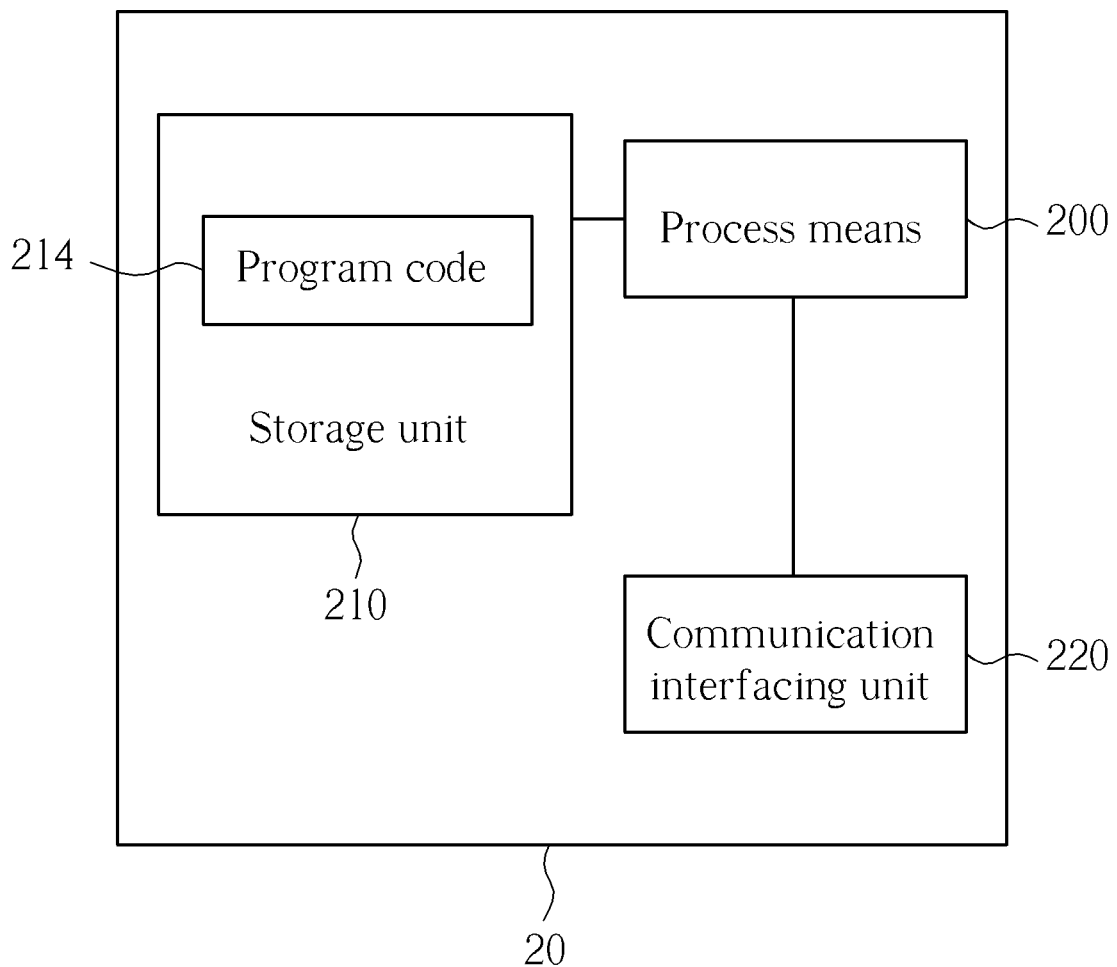
FIG. 2 is a schematic diagram of a communication device according to an example of the present invention.

Please refer to FIG. 2, which is a schematic diagram of a communication device 20 according to an example of the present invention. The communication device 20 can be a UE, a BS or a relay node shown in FIG. 1, but is not limited herein. The communication device 20 may include a process means 200 such as a microprocessor or an Application Specific Integrated Circuit (ASIC), a storage unit 210 and a communication interfacing unit 220. The storage unit 210 may be any data storage device that can store a program code 214, accessed by the process means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver and can exchange wireless signals with the network according to processing results of the process means 200.

Figure 3:
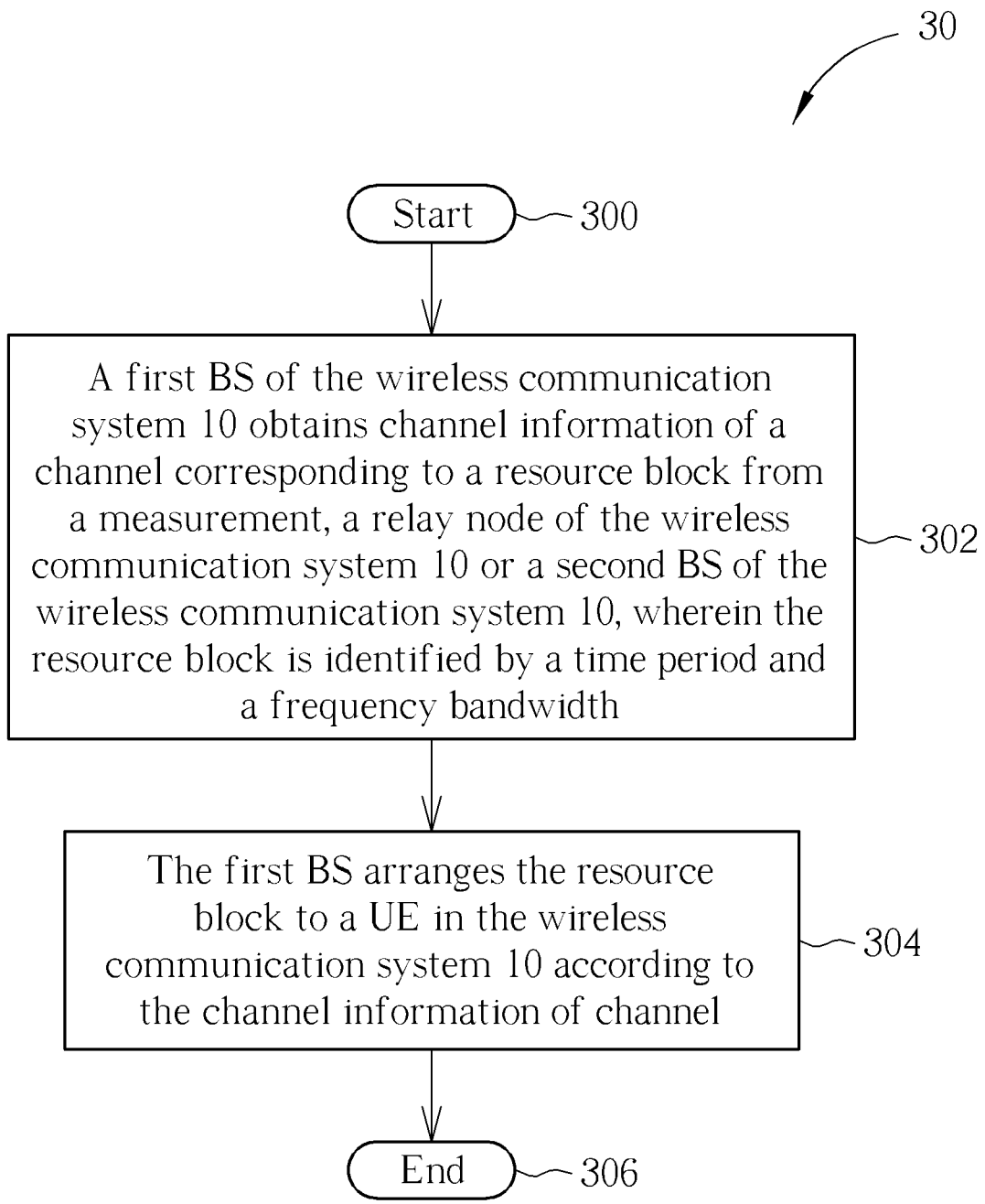
FIG. 3 is a flowchart of a process according to the present invention.

Please refer to FIG. 3, which is a flowchart of a process 30 according to an example of the present invention. The process 30 is utilized in the macrocell BS MBS1-MBS3, the picocell BS PBS, the femtocell BS FBS and the relay nodes RN1-RN3 shown in FIG. 1, for handling resource arrangement in the wireless communication system 10. The process 30 may be compiled into the program code 214 and includes the following steps:

Step 300: Start.

Step 302: A first BS of the wireless communication system 10 obtains channel information of a channel corresponding to a resource block from a measurement, a relay node of the wireless communication system 10 or a second BS of the wireless communication system 10, wherein the resource block is identified by a time period and a frequency bandwidth.

Step 304: The first BS arranges the resource block to a UE in the wireless communication system 10 according to the channel information of channel.

Step 306: End.

According to the process 30, before the first BS arranges the resource block to the UE, the first BS obtains the channel information of the channel corresponding to the resource block from the measurement, the relay node or the second BS, wherein the resource block is identified by the time period and the frequency bandwidth. Then, the first BS arranges the resource block to the UE according to the channel information of channel. In other words, since interference (e.g. co-channel interference) exists in the wireless communication 10, the first BS does not arbitrarily arrange the resource block to the UE, but arranges the resource block to the UE according to the channel information of the channel via which the resource block is transmitted by the first BS or the UE. Besides, the first BS can obtain the channel information by measuring the channel by itself, receiving the channel information from the relay node and the second BS, and is not limited herein. Therefore, transmission between the first BS and the UE is not interfered or is slightly interfered. Benefit such as improved throughput and low power consumption introduced by the heterogeneous network can be realized efficiently.

Please note that, spirit of the process 30 is that a BS arrange a resource block to a UE according to channel information of a channel via which the resource block is transmitted by the BS or the UE, and a method based on which the BS arranges the resource block and obtains the channel information is not limited. For example, please refer back to FIG. 1, operation of the macrocell MCEL1 is used for illustrating an example as follows. The macrocell BS MBS1 prepares to arrange a resource block to the UE UE1, and needs to obtain channel information of a channel via which the resource block is transmitted by the macrocell BS MBS1 or the UE UE1. Since the relay nodes RN1-RN2 are in the macrocell MCEL1 and are managed by the macrocell BS MBS1, the macrocell BS MBS1 can obtain the channel information from the relay nodes RN1-RN2. In detail, the macrocell BS MBS1 first determines feedback resource used by the relay node RN1 for reporting the channel information. Then, the macrocell BS MBS1 sends a measurement request to the relay node RN1 for indicating the relay node RN1 to measure the channel and reporting the channel information via the feedback resource. After receiving the measurement request, the relay node RN1 measures the channel to obtain the channel information, and reports the channel information to the relay node RN1 via the feedback resource. Alternatively, the channel information has been stored in the relay node RN1. The relay node RN1 does not need to measure the channel, and can report the channel information to the relay node RN1 via the feedback resource immediately. On the other hand, the macrocell BS MBS1 can also obtain the channel information from the relay node RN2 according to the above illustration, and is not limited herein. After the macrocell BS MBS1 receives the channel information, the macrocell BS MBS1 can arrange the resource block to the UE UE1 according to the channel information. The above illustration can also be realized in the macrocell BS MBS3 which manages the relay node RN3, and needs channel information for communicating with the UE4 via the relay node RN3, and the detail is not narrated herein.

Please refer back to FIG. 1, operation of the femtocell FCEL is used for illustrating another example as follows. The femtocell BS FBS prepares to arrange a resource block to the UE UE2, and needs to obtain channel information of a channel via which the resource block is transmitted by the femtocell BS FBS or the UE UE2. Since the femtocell BS FBS does not manage any relay node, the femtocell BS FBS can measure the channel to obtain the channel information by itself. Alternatively, the femtocell BS FBS can obtain the channel information from neighboring BSs, e.g., the macrocell BSs MBS1-MBS2 and the picocell BS PBS. In detail, the femtocell BS FBS sends an exchanging request to one of the neighboring BSs (e.g. the macrocell BS MBS2) for requesting the channel information. The macrocell BS MBS2 replies the channel information to the femtocell BS FBS, if the macrocell BS MBS2 accepts the exchanging request (e.g. if the macrocell BS MBS2 has the channel information). On the other hand, the femtocell BS FBS may also request the channel information from the macrocell BS MBS1 or the picocell BS PBS according to the above illustration, and is not limited herein. After the femtocell BS FBS receives the channel information, the femtocell BS FBS can arrange the resource block to the UE UE2 according to the channel information. The above illustration can also be realized in the picocell BS PBS which does not manage any relay node, and needs channel information for communicating with the UE3, and the detail is not narrated herein.

Please note that, action taken by a BS for arranging a resource block to a UE according to channel information of a channel is not limited, wherein the channel is used for transmitting the resource block. For example, the BS allocates the resource block to the UE if quality of the channel is good, i.e., quality of the channel included in the channel information is above a predefined level. Oppositely, the BS does not allocate the resource block to the UE if the channel is severely interfered, i.e., the quality of the channel included in the channel information is below the predefined level. Preferably, the predefined level is defined by an operator of the BS, and is stored in the BS. Further, the BS may arrange the resource block flexibly by adjusting a modulation scheme and a coding rate used for the resource block according to the channel information, when allocating the resource block to the UE.

Besides, the channel information may include any information which is helpful for the arrangement of the resource block, and is not limited. For example, the channel information may include a raw value of received interference power on the channel which introduces a large amount of overhead or a quantized value of the received interference power on the channel which introduces a small amount of the overhead. Further, the channel information may only include a binary value introducing the smallest amount of the overhead, for indicating whether the channel is occupied by considering the received interference power on the channel. When the channel information is obtained from another BS (e.g., a macrocell BS, a picocell BS or a femtocell BS), the channel information may include arrangement of the resource block performed by the another BS, and the channel information is the more accurate than that obtained from a measurement. For example, the macrocell BS MBS1 requests channel information of a channel from the picocell BS PBS and the macrocell BS MBS2. The picocell BS PBS and the macrocell BS MBS2 can reply the macrocell BS MBS1 that whether they have allocated the channel for resource blocks or not.

On the other hand, the channel may be a UL channel or a DL channel for the UE. Since a resource block is identified or labeled by both a time period and a frequency bandwidth, the time period and the frequency bandwidth are preferably defined according to system requirements. For example, the time period may indicate only a length in time of a resource block, or may precisely indicate both a start time and an end time of the time period of the resource block. Similarly, the frequency bandwidth may indicate only a width in bandwidth of the resource block, or may precisely indicate both a start frequency and an end frequency of the frequency bandwidth of the resource block. Besides, the BSs can exchange channel information with each other via an X2 interface defined in the 3GPP standard, and is not limited herein.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for mitigating interference in a heterogeneous network by performing channel measurement. The method can be realized in BSs and relay nodes. Transmission between a BS and a UE is not interfered or is slightly interfered according to the present invention. Benefit such as improved throughput and low power consumption introduced by the heterogeneous network can be realized efficiently without being affected by the interference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling resource arrangement for a first base station of a wireless communication system, the method comprising:
    obtaining channel information of a channel corresponding to a resource block from a measurement, a relay node of the wireless communication system or a second base station of the wireless communication system, wherein the resource block is identified by a time period and a frequency bandwidth;
    allocating the resource block to a mobile device in the wireless communication system if quality of the channel comprised in the channel information is above a predefined level stored in the first base station; and
    stopping allocating the resource block to the mobile device if the quality of the channel is below the predefined level, such that transmission of the resource block is not interfered or is slightly interfered.

2. The method of claim 1, wherein obtaining the channel information of the channel corresponding to the resource block from the measurement comprises:
    measuring the channel to obtain the channel information, if there is no relay node managed by the first base station.

3. The method of claim 1, wherein obtaining the channel information of the channel corresponding to the resource block from the relay node comprises:
    determining feedback resource used by the relay node for reporting the channel information, if the relay node is managed by the first base station;
    sending a measurement request to the relay node for indicating the relay node to measure the channel and reporting the channel information via the feedback resource; and
    receiving the channel information transmitted by the relay node via the feedback resource.

4. The method of claim 1, wherein obtaining the channel information of the channel corresponding to the resource block from the second base station comprises:
    sending a exchanging request to the second base station for requesting the channel information; and
    receiving the channel information transmitted by the second base station, if the exchanging request is granted by the second base station.

5. The method of claim 1, wherein the first base station adjusts a modulation scheme and a coding rate used for the resource block according to the channel information, when allocating the resource block to the mobile device.

6. The method of claim 1, wherein the channel information comprises a raw value of received interference power on the channel or a quantized value of the received interference power on the channel.

7. The method of claim 1, wherein the channel information comprises a binary value indicating whether the channel is occupied.

8. The method of claim 1, wherein the channel information comprises arrangement of the resource block performed by the second base station, when the first base station obtains the channel information from the second base station.

9. The method of claim 1, wherein the channel is an uplink (UL) channel or a downlink (DL) channel.

10. The method of claim 1, wherein each of the first base station and the second base station is a macrocell base station, a picocell base station or a femtocell base station.

11. The method of claim 1, wherein the first base station and the second base station communicate with each other via an X2 interface defined in the 3GPP standard.

12. The method of claim 1, wherein the wireless communication system is an orthogonal frequency-division multiplexing (OFDM) system or an orthogonal frequency-division multiple access (OFDMA) system.

13. A method of handling channel measurement for a relay node of a wireless communication system, the method comprising:
    receiving a measurement request transmitted by a base station of the wireless communication system, and the measurement request indicating a channel and a feedback resource;
    measuring the channel to obtain channel information of the channel or using the channel information stored in the relay node; and
    transmitting the channel information to the base station via the feedback resource, for the base station to arrange a resource block to a mobile device according to the channel information.

14. The method of claim 13, wherein the relay node is managed by the base station.

15. The method of claim 13, wherein the channel information comprises a raw value of received interference power on the channel or a quantized value of the received interference power on the channel.

16. The method of claim 13, wherein the channel information comprises a binary value indicating whether the channel is occupied.

17. The method of claim 13, wherein the channel is an uplink (UL) channel or a downlink (DL) channel for the base station.

18. The method of claim 13, wherein the base station is a macrocell base station, a picocell base station or a femtocell base station.

19. The method of claim 13, wherein the channel is identified by a time period and a frequency bandwidth.

20. The method of claim 13, wherein the wireless communication system is an orthogonal frequency-division multiplexing (OFDM) system or an orthogonal frequency-division multiple access (OFDMA) system.

* * * * *

UNITED STATES PATENT AND TRADEMARK OFFICE
CERTIFICATE OF CORRECTION

| | | |
|---|---|---|
| PATENT NO. | : 8,879,411 B2 | Page 1 of 1 |
| APPLICATION NO. | : 13/326346 | |
| DATED | : November 4, 2014 | |
| INVENTOR(S) | : Kwang-Cheng Chen et al. | |

It is certified that error appears in the above-identified patent and that said Letters Patent is hereby corrected as shown below:

On the title page under item (12), delete "Jen et al." and insert -- Chen et al --.

On the title page, item (75), correct the order of the names of the inventors from "Yu-Chih Jen, Kwang-Cheng Chen, Shao-Yu Lien" to -- Kwang-Cheng Chen, Shao-Yu Lien, Yu-Chih Jen --.

Signed and Sealed this
Third Day of March, 2015

Michelle K. Lee
*Deputy Director of the United States Patent and Trademark Office*